United States Patent
Takaoka

(10) Patent No.: US 7,106,466 B2
(45) Date of Patent: Sep. 12, 2006

(54) METHOD AND APPARATUS FOR EFFECTIVELY CONTROLLING USE OF SPECIFIC COMMUNICATIONS SERVICE

(75) Inventor: Tatsuo Takaoka, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 874 days.

(21) Appl. No.: 09/751,253

(22) Filed: Dec. 28, 2000

(65) Prior Publication Data

US 2001/0021029 A1    Sep. 13, 2001

(30) Foreign Application Priority Data

Dec. 28, 1999    (JP)    ................. 11-372147

(51) Int. Cl.
*G06K 1/00* (2006.01)
*H04N 1/00* (2006.01)
*H04M 11/00* (2006.01)

(52) U.S. Cl. .................... 358/1.15; 358/1.16; 358/400; 358/401; 358/404; 379/100.01; 379/100.05; 379/102.07

(58) Field of Classification Search ............... 358/1.15, 358/1.16; 709/201; 340/5.52, 5.8, 5.81, 340/5.82; 283/68, 78; 382/115, 116, 117, 382/118, 119, 124; 713/182, 186; 379/201.1, 379/355.01

See application file for complete search history.

(56) References Cited

U.S. PATENT DOCUMENTS

| | | | |
|---|---|---|---|
| 4,870,678 A | | 9/1989 | Adachi |
| 4,975,783 A | | 12/1990 | Takaoka |
| 5,418,625 A | | 5/1995 | Shimoosawa |
| 5,758,077 A | * | 5/1998 | Danahy et al. ............. 709/201 |
| 5,923,440 A | * | 7/1999 | Goto .......................... 358/406 |
| 6,208,658 B1 | * | 3/2001 | Pickett ....................... 370/401 |
| 6,618,478 B1 | * | 9/2003 | Stuckman et al. ..... 379/355.01 |
| 6,654,453 B1 | * | 11/2003 | Malik .................... 379/201.01 |
| 6,671,508 B1 | * | 12/2003 | Mitsuoka et al. ........ 455/412.1 |

FOREIGN PATENT DOCUMENTS

| | | |
|---|---|---|
| EP | 0909107 | 4/1999 |
| JP | 57-134772 | 8/1982 |
| JP | 63-313965 | 12/1988 |
| JP | 2-57044 | 2/1990 |
| JP | 5-14469 | 1/1993 |
| JP | 5-50719 | 3/1993 |
| JP | 5-160919 | 6/1993 |
| JP | 5-236161 | 9/1993 |

(Continued)

*Primary Examiner*—Mark Wallerson
*Assistant Examiner*—Thomas J. Lett
(74) *Attorney, Agent, or Firm*—Cooper & Dunham LLP

(57) ABSTRACT

A communications terminal is connected to at least one of a telephone line and a local area network and includes a first memory, a second memory, a detector, and an indicating mechanism. The first memory stores service information including availability information representing availability of a specific communications service provided by a service provider through at least one of the telephone line and the local area network and condition information suitable to the specific communications service. The second memory stores message information indicating that the specific communications service is not usable. The detector is configured to detect whether the service information stored in the first memory is appropriate each time the communications terminal starts a call connection operation to use the specific communications service based on the condition information. The indicating mechanism is configured to read the first memory and to indicate the message information indicating that the specific communications service is not usable when the detector detects that the service information stored in the first memory is inappropriate.

23 Claims, 13 Drawing Sheets

FOREIGN PATENT DOCUMENTS

| | | |
|---|---|---|
| JP | 5-236162 | 9/1993 |
| JP | 5-327990 | 12/1993 |
| JP | 7-18204 | 4/1995 |
| JP | 9-34837 | 2/1997 |
| JP | 11-146171 | 5/1999 |
| JP | 11-205506 | 7/1999 |
| JP | 11-217030 | 8/1999 |

* cited by examiner

| SPECIFIC SERVICE REGISTRATION TABLE | | | |
|---|---|---|---|
| SERVICES | AVAILABILITY | PERTINENT INFORMATION | DUMMY DISCONNECTION-CAUSE CODE |
| SERVICE 1 | AVAILABLE | INFORMATION 1 | 0xf3 |
| SERVICE 2 | NOT AVAILABLE | INFORMATION 2 | 0xf4 |
| SERVICE 3 | NOT AVAILABLE | INFORMATION 3 | 0xf5 |
| ⋮ | ⋮ | ⋮ | ⋮ |

FIG. 4

CODE/NUMBER REFERENCE TABLE (3b)

| DISCONNECTION-CAUSE CODE | NOTIFICATION NUMBER |
|---|---|
| ⋮ | ⋮ |
| 11 | 2 |
| 12 | 3 |
| 13 | 3 |
| 14 | 0 |
| 15 | 4 |
| 16 | 5 |
| ⋮ | ⋮ |
| 0xf3 | N1 |
| 0xf4 | N2 |
| 0xf5 | N3 |

NOTIFICATION FROM ISDN: rows with codes 11–16

SELF-NOTIFICATION: rows with codes 0xf3, 0xf4, 0xf5

| NUMBER/CONTENTS REFERENCE TABLE ||
|---|---|
| NOTIFICATION NUMBER | CONTENTS OF NOTIFICATION |
| 1 | A CALLED NUMBER IS INCORRECT |
| 2 | A CALLED TERMINAL IS BUSY |
| ⋮ | ⋮ |
| n |  |
| N1 | AAA SERVICE IS NOT AVAILABLE |
| N2 | BBB SERVICE IS NOT AVAILABLE |
| ⋮ | ⋮ |

| NUMBER/GUIDANCE REFERENCE TABLE ||
|---|---|
| NOTIFICATION NUMBER | CONTENTS OF GUIDANCE |
| N1 | PLEASE CHECK IF XXX IS PROPERLY REGISTERED |
| N2 | PLEASE CHECK IF YYY IS PROPERLY REGISTERED |

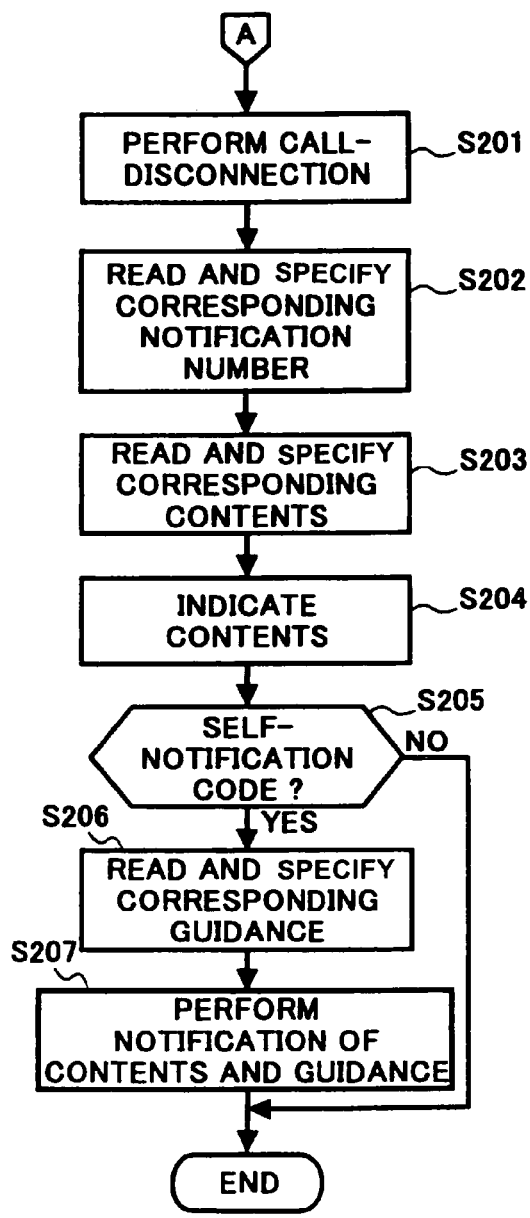

FIG. 9

| NUMBER/VOICE REFERENCE TABLE ||
|---|---|
| NOTIFICATION NUMBER | VOICE DATA OF NOTIFICATION |
| 1 | NUMBER IS INCORRECT |
| 2 | CALLED TERMINAL IS BUSY |
| ⋮ | ⋮ |
| n | |
| N1 | AAA SERVICE IS NOT AVAILABLE |
| N2 | BBB SERVICE IS NOT AVAILABLE |
| ⋮ | ⋮ |

PLEASE CHECK IF XXX IS PROPERLY
REGISTERED

| NUMBER/CONTENTS & GUIDANCE REFERENCE TABLE ||
|---|---|
| NOTIFICATION NUMBER | CONTENTS AND GUIDANCE OF NOTIFICATION |
| 1 | A CALLED NUMBER IS INCORRECT |
| 2 | A CALLED TERMINAL IS BUSY |
| ⋮ | ⋮ |
| n | |
| N1 | AAA SERVICE IS NOT AVAILABLE PLEASE CHECK IF XXX IS PROPERLY REGISTERED |
| N2 | BBB SERVICE IS NOT AVAILABLE PLEASE CHECK IF YYY IS PROPERLY REGISTERED |

FIG. 18

* ERROR REPORT *  99/11/27 12:34

AAA SERVICE IS NOT AVAILABLE
PLEASE CHECK IF XXX IS PROPERLY REGISTERED

CALLED NUMBER  : 163-*00#22

METHOD AND APPARATUS FOR EFFECTIVELY CONTROLLING USE OF SPECIFIC COMMUNICATIONS SERVICE

FIELD

This patent specification relates to a method and apparatus for communications, and more particularly to a method and apparatus for communications that effectively control the use of specific communications services.

RELATED TECHNOLOGY

Communications terminals such as facsimile machines typically are configured to be compatible with services provided by a plurality of communication service carriers. But, in some cases, the communications terminals cannot perform a communications operation using specific communications services with a regular setting of conditions.

Since it is an option for a user to select the communications service carriers and the communications services to use for a communications terminal, an appropriate setting is required of conditions which are suitable for the selected communications service carriers and for the selected communications services.

For example, a service profile identifier (SPID) which is used in the communications system in the United States of America is an identification required for a communications terminal to send when the communications terminal performs a call connection to use a specific communications service.

For such a purpose, the communications terminal is generally provided with selectively usable settings of conditions suitable for a variety of communications services and carriers. When the user selects the communications service to use on a communications terminal, the user needs to change the setting of conditions to a suitable one.

For example, a communications terminal connected to an ISDN (integrated services digital network) is classified according to its attribute as a Group 4 facsimile machine or a digital telephone machine.

It is possible that a facsimile machine uses a plurality of different communications services provided by different communications service providers or a single provider.

The ISDN notifies a call-disconnection-cause such as A a called terminal is busy" or "a called number is incorrect" in a form of a CPS (call processing signal) code to a communications terminal.

When a communications terminal receives a call-disconnection-cause code which is not readable by human, if the contents of the cause should be understandable by the user, the communications terminal converts the contents into a human-readable message, such as "a called terminal is busy," "a called number is incorrect," and so on, and displays these messages to the user. But, if the contents of the cause are not understandable by the user, or if the cause is one that rarely occurs or if the cause is of unusual nature, the communications terminal can merely display a number corresponding to the cause to the user. In a typical communications procedure (i.e., X.25, X.21, and Q.931), the communications terminal converts a call-disconnection-cause code notified from the network side into a message that it displays to the user.

In order to provide such a message display to the user, the communications terminal needs the proper setting of the conditions suitable for the specific communications services used. That is, when the communications terminal does not have the proper setting for the specific communications services used, the communications terminal will typically lose the call connection and receive a cause code which may not be reliable or understandable to the user. Thereby, the user will receive a notification based on such an unreliable cause or incomprehensible message, which accordingly typically increases the number of inquiries about this trouble from the users to the manufacturer of the communications terminal or to the service provider.

SUMMARY

This patent specification describes a novel communications terminal connected to at least one of a telephone line and a local area network. In one example, a novel communications terminal includes a first memory, a second memory, a detector, and an indicating or display mechanism. The first memory stores service information including availability information representing availability of a specific communications service provided by a service provider through at least one of a telephone line and a local area network and condition information suitable for the specific communications service. The second memory stores message information indicating that the specific communications service is not usable. The first and second memories (and all other memories referred to below) can be implemented as any suitable information storage device(s) that can function to store the two or more different kinds of information, and need not be physically separate or even separable devices. The detector is configured to detect whether the service information stored in the first memory is appropriate each time the communications terminal starts a call connection operation that would use the specific communications service based on the condition information. The indicating mechanism is configured to read the first memory and to indicate the message information indicating that the specific communications service is not usable when the detector detects that the service information stored in the first memory is inappropriate.

The above-mentioned facsimile apparatus further includes a third memory which stores guidance information that may help make usable a specific communications service that may have been found not to be usable. In this case, the indicating mechanism is further configured to read the third memory and to indicate the guidance information upon a predetermined input for starting a guidance indication operation after the indicating mechanism indicates the message information indicating that the specific communications service is not usable.

The above-mentioned communications terminal further includes in the third memory guidance information that may help overcome the unavailability of a specific communications service. In this case, the indicating mechanism is further configured to read the third memory and to indicate the guidance information after a predetermined time has elapsed from the indicating mechanism indicating the message information to the effect that the specific communications service is not available or usable.

The second memory may further store guidance information for guiding a way to overcome the unavailability of a specific communications service that is not usable or available and the indicating mechanism indicates the message information indicating that the specific communications service is not usable and the guidance information when the detector detects that the service information stored in the first memory is inappropriate.

The indicating mechanism may indicate the message information and the guidance information through a display.

The indicating mechanism may send the message information and the guidance information to a sound mechanism so as to output the message information and the guidance information as a voice message or display, or to a printing apparatus so as to output the message information and the guidance information on a recording sheet and/or as a visual display in some other form.

This disclosure further describes a novel method of using a specific communications service provided by a service provider. In one example, a novel method includes the steps of providing a first storing step, detecting, reading, and indicating. The providing step provides service information including availability information representing availability of the specific communications service on a communications terminal connected to at least one of a telephone line and a local area network and condition information suitable for the specific communications service. The first storing step stores message information indicating if the specific communications service is not usable. The detecting step detects whether the service information provided in the providing step is appropriate each time a call connection operation is started on the communications terminal to use the specific communications service based on the condition information. The reading step reads the service information. The indicating step indicates that the specific communications service is not usable when the detecting step detects that the service information provided in the providing step is inappropriate.

This patent specification further describes a novel computer readable medium which stores computer instructions for performing the steps recited in the above-mentioned novel method.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is an example of a specific service registration table used in the facsimile apparatus of FIG. 1;

FIG. 4 is an example of a code/number reference table used in the facsimile apparatus of FIG. 1;

FIG. 5 is an example of a number/contents reference table used in the facsimile apparatus of FIG. 1;

FIG. 6 is an example of a number/guidance reference table used in the facsimile apparatus of FIG. 1;

FIGS. 7A and 7B are flowcharts for explaining a call connection operation performed by the facsimile apparatus of FIG. 1;

FIG. 8 is an example of an indication provided when a specific service is not available during the call connection operation requiring the specific service;

FIG. 9 is an example of a number/voice reference table used in the facsimile apparatus of FIG. 1;

FIG. 12 is another example of an indication indicated to notify the user of the guidance for solving a problem;

FIG. 13 is an example of a number/contents and guidance reference table used in the facsimile apparatus of FIG. 1;

FIG. 18 is an example of the error report generated through the operation of FIG. 17.

DETAILED DESCRIPTION

Figure 1:
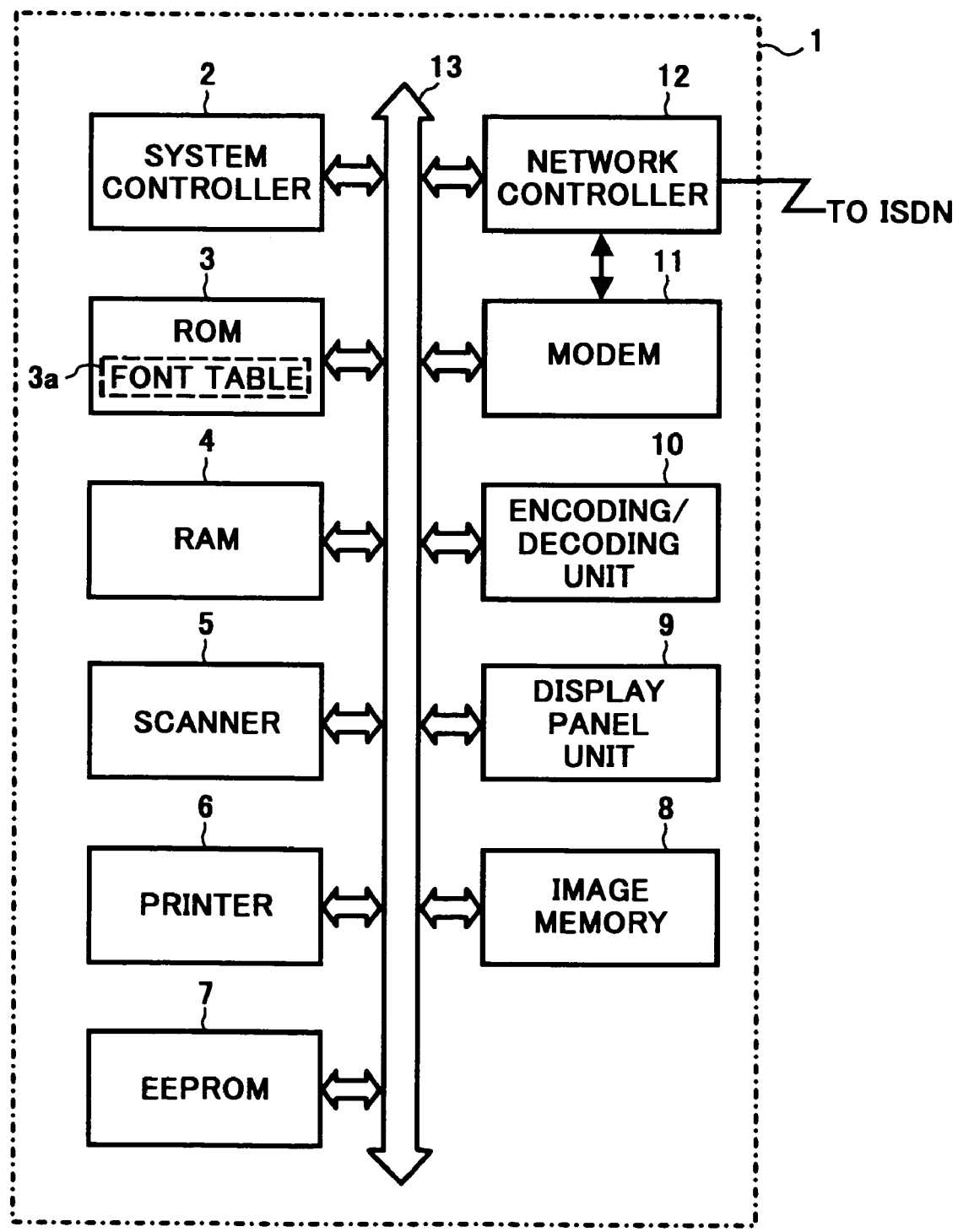
FIG. 1 is a schematic block diagram of a facsimile apparatus.

In describing preferred embodiments illustrated in the drawings, specific terminology is employed for the sake of clarity. However, the disclosure herein is not intended to be limited to the specific terminology so selected and it is to be understood that each specific element includes all technical equivalents that operate in a similar manner or achieve similar results, including elements developed after the filing date hereof.

Referring now to the drawings, wherein like reference numeral designate identical or corresponding parts throughout the several views, particularly to FIG. 1, a facsimile apparatus 1 according to an embodiment of the present invention is described. FIG. 1 shows a block diagram of the facsimile apparatus 1 which includes a system controller 2, a ROM 3, a RAM 4, a scanner 5, a printer 6, an EEPROM (electrically erasable programmable ROM) 7, an image memory 8, a display panel unit 9, an encoding/decoding unit 10, a Modem 11, a network controller 12, and an internal bus 13.

The system controller 2 controls the operations of the facsimile apparatus 1, including a facsimile data transmission control for transmitting and receiving image information and arbitrary data files according to a predefined communications procedure (i.e., a Group-3 facsimile communications procedure). The ROM (read only memory) 3 includes an electrically reprogrammable read only memory (i.e., a flash ROM) and stores control (or application) programs to be executed by the system controller 2 and a plurality of lookup tables used when executing the control programs. The lookup tables in the ROM 3 include a font table 3a, as shown in FIG. 1. When the system controller 2 converts a row of characters into image information, it uses font information stored in the font table 3a. Other lookup tables are explained later.

The RAM (random access memory) 4 of FIG. 1 includes a working memory area reserved for use by the system controller 2. The scanner 5 reads an image of a document at one of predetermined image reading resolutions (i.e., 3.85 lines per mm, 7.7 lines per mm, 15.4 lines per mm, etc.). The printer 6 produces an image output at a predefined print resolution in accordance with the predetermined image reading resolution, based on image data obtained either through a facsimile receiving operation or a scanning operation with the scanner 5. The printer 6 records image information, received from other facsimile machines or scanned by the scanner 5, on a recording sheet in accordance with a linear density of the image information.

The EEPROM 7 is an electrically reprogrammable read-only memory for storing various parameters necessary for operations of the facsimile apparatus 1, even when the main power of the facsimile apparatus 1 is turned off. The image memory 8 temporarily stores image information to be transmitted to and which are sent from other facsimile terminals, and is used for a bitmapping of image information each time various kinds of facsimile reports, explained later, are generated.

The display panel unit 9 includes various kinds of operational keys and a display that serves as an interface between an operator and the facsimile apparatus 1, as explained later. The encoding/decoding unit 10 encodes image information to be transmitted to other facsimile terminals such that the information is compressed. Also, the encoding/decoding unit 11 decodes the compressed image information that is transmitted from other facsimile terminals back into original image information. For these compression and decompression operations, the encoding/decoding unit 11 uses various compression and decompression methods such as MH (modified Huffman), MR (modified READ), and MMR (modified modified READ) methods conformable to requirements of the Group 3 facsimile communications procedure.

The Modem 11 is preferably a Group 3 facsimile modem that performs the functions of a modem for the Group 3 facsimile machine. More specifically, the modem 11 modulates a data signal to be transmitted to other facsimile machines and it converts a modulated data signal received from other facsimile machines back into an original data signal which is unmodulated. Also, the modem 11 produces a DTMF (dial tone multi-frequency) signal having a dial tone in response to a telephone number entered by an operator and sends the signal to other facsimile machines. In addition, the modem 11 has a feature of a low-speed modem such as a V.21 modem for transmitting and receiving communication protocols and a feature of a high-speed modem such as V.17, V.34, V.29, or V.27ter modems for mainly transmitting and receiving image information.

The network controller 12 is connected to an outside line such as a public switched telephone network (PSTN), and has a direct internal connection to the Modem 11. The network controller 12 includes an automatic transmitting and receiving function, and controls the connection of the facsimile apparatus 1 to various telephone networks such as the PSTN. More specifically, when the facsimile apparatus 1 is connected to the PSTN, the network controller 12 performs a variety of functions including controls of connection and disconnection of the line by forming a direct current loop through the line. The functions of the network controller 12 further include controls related to the connection to the line such as detection of an event in that a polarity of the line is reversed, disconnection of the line, dialing tones, tone signals such as a busy tone, and a calling signal. In addition, the network controller 12 generates dialing pulses.

When the facsimile apparatus 1 is connected to an integrated services digital network (ISDN), the network controller 12 controls the connection to the ISDN. When the facsimile apparatus 1 is connected to a local area network (LAN), the network controller 12 controls the connection to the LAN. When the facsimile apparatus 1 is connected to a certain network using a dial-up connection, the network controller 12 controls a dial-up connection in accordance with a control function of this network.

The above-described various units of the facsimile apparatus 1 communicate with each other through the respective connections to the internal bus 13, as shown in FIG. 1.

Figure 2:
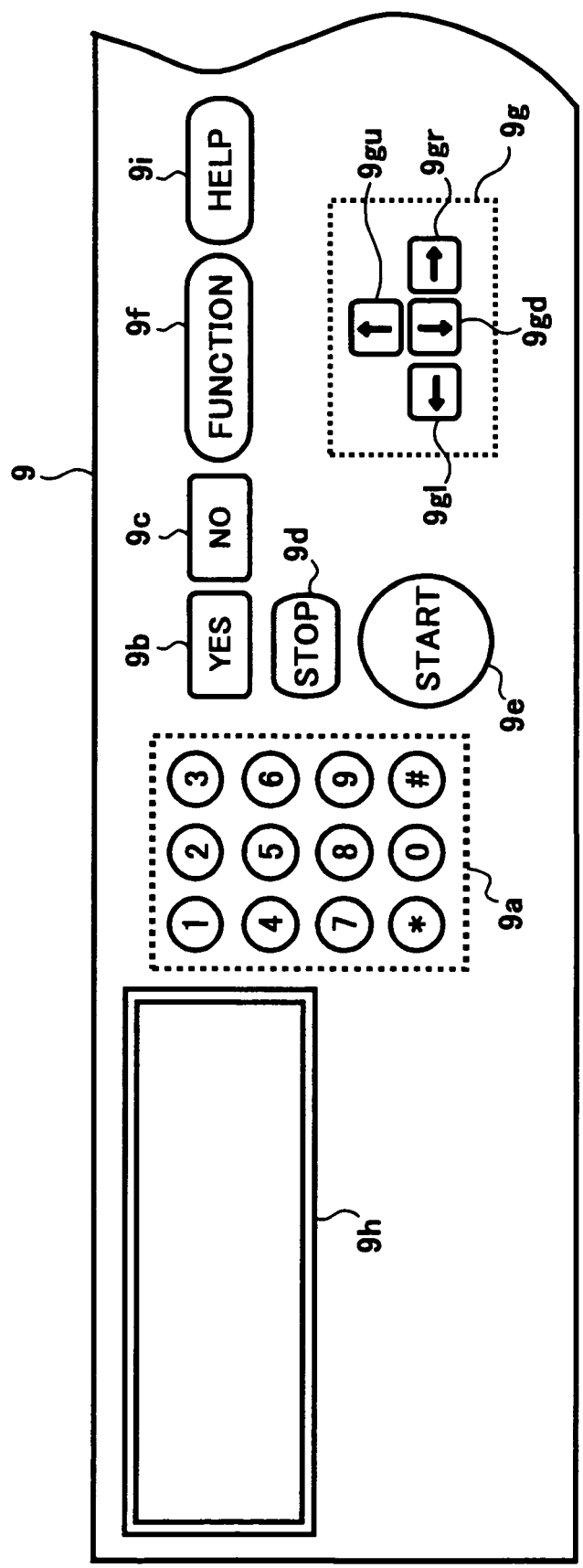
FIG. 2 is an illustration showing a display panel unit of the facsimile apparatus of FIG. 1.

Referring to FIG. 2, details of the display panel unit 9 is explained. The display panel unit 9 includes various components such as a ten-key pad 9a, a YES key 9b, a NO key 9c, a STOP key 9d, a START key 9e, a FUNCTION key 9f, a cursor-key pad 9g including a LEFT key 9gl, a RIGHT 9gr, an UP key 9gu, and a DOWN key 9gd, an LCD (liquid crystal display) 9h, and a HELP key 9i.

The ten-key pad 9a enters a numeric code representing, for example, a facsimile number of a destination facsimile machine. The YES and NO keys 9b and 9c respectively enter a user determination at each selection step throughout various operational procedures. The STOP key 9d enters an instruction for stopping an action. The START key 9e enters instructions for starting facsimile communications operations and a copying operation.

The FUNCTION key 9f calls up a variety of functions by entering a numeric code through the ten-key pad 9a after pressing the FUNCTION key 9f. Using the FUNCTION key 9f, the user can perform facsimile number registrations for a one-touch-dialing operation and for a short-dialing operation, and an entry of user parameters. Further, the user can perform non-standard enhanced functions such as a transmission operation to be performed at a designated time, a transmission operation which requires an entry of a sender code, a polling operation, and so forth.

The UP key 9gu and the DOWN key 9gd of the cursor-key pad 9g respectively change the position of the cursor shown in the LCD 9h or the contents of the LCD 9h, or scroll the contents of the LCD 9h up and down. The LEFT key 9gl and the RIGHT key 9gr of the cursor-key pad 9g respectively selects one of subjects or functions shown in the LCD 9h. The LCD 9h indicates various kinds of information such as information of operational statuses, a variety of messages to an operator, and so forth. The HELP key 9i activates a guidance operation for indicating various kinds of guidance messages corresponding to an operation under processed.

The facsimile apparatus 1 of FIG. 1 is able to use various kinds of communications services provided by the network (i.e., the ISDN) to which the network controller 12 of the facsimile apparatus 1 is connected. In this example being explained, the network controller 12 is connected to the ISDN, as shown in FIG. 1. In order to use the communications services, the facsimile apparatus 1 may need to perform the communications operation differently from regular communications services. For example, the facsimile apparatus 1 may need to send specific ID (identification) information to the ISDN at a calling process. For this purpose, the facsimile apparatus 1 is configured to have a specific service registration table 7a, as shown in FIG. 3, in the EEPROM 7.

The specific service registration table 7a is previously input into the EEPROM 7 with the display panel unit 9 through an interactive input operation, for example.

The specific service registration table 7a of FIG. 3 includes a plurality of the communications services which can be used by the facsimile apparatus 1 and which are referred to as specific services 1, 2, 3, and so on. In the specific service registration table 7a, each of the specific communications services is provided with three kinds of information, as shown in FIG. 3. First information relates to availability of the corresponding specific communications service, which indicates whether the facsimile apparatus 1 can use this specific communications service. Second information provides pertinent information which includes an ID number, for example, reserved for use of the corresponding specific communications services. The pertinent information is registered in a form such as information 1, 2, 3, and so on. Third information contains a dummy call-disconnection-cause code representing a cause of disconnection due to the registration of incorrect pertinent information.

In the example of FIG. 3, the specific communications services 1 is given "available" in the availability information, and the information 1 of the pertinent information needs to be correct. The above-mentioned dummy call-disconnection-cause codes for incorrect pertinent information may be stored in the ROM 3 as long as these codes are appropriately linked to the respective specific communications services, since they are fixed codes for the system.

The cause of a call disconnection is normally notified from the network (i.e., the ISDN) with a code of CPS (call processing signal) which code is called the call-disconnection-cause code. In this example, however, incorrect pertinent information which is an internal problem and leads to a call disconnection is also handled as a cause of a call disconnection. Such a call-disconnection caused by incorrect pertinent information is notified by the facsimile apparatus 1 itself with a code of a call disconnection. In order to distinguish the case of the call-disconnection caused by incorrect pertinent information from the common call-disconnection-cause code sent from the network (i.e., the ISDN), the code is referred to as a dummy call-disconnection-cause code.

For example, when the information 1 related to the specific communications service 1 is incorrect, the network controller 12 judges that a call-disconnection is caused, wherein the call-disconnection is represented by a call-disconnection-cause code 0xf3. Thereby, such a call connection error caused by the incorrect pertinent information can be treated in a manner similar to those call connection errors caused by common call-disconnection causes, such as "a called terminal is busy," "a call number is incorrect," and so on, notified from the network (i.e., the ISDN).

The facsimile apparatus 1 is also provided with a code/number reference table 3b of FIG. 4, which is stored in the ROM 3. As shown in FIG. 4, the code/number reference table 3b includes code information representing a plurality of the call-disconnection-cause codes such as 11, 12, 13, and so on sent from the network (i.e., the ISDN) and a plurality of the dummy call-disconnection-cause codes such as N1, N2, N3, and so on generated by the facsimile apparatus 1 itself. The code/number reference table 3b further includes number information representing notification numbers corresponding to the code information on a one-to-one basis, as shown in FIG. 4. Some call-disconnection-cause codes are associated with the same notification number. For example, the codes 12 and 13 correspond to the notification number 3.This is because in some cases different call-disconnection-cause codes possibly represent the same call-disconnection-cause such as "the called party is busy," for example.

The facsimile apparatus 1 is also provided with a number/contents reference table 3c of FIG. 5, which is stored in the ROM 3. As shown in FIG. 5, the number/contents reference table 3c includes contents information associated with the notification numbers on a one-to-one basis. The contents information includes a row of characters representing messages. For example, to the notification numbers related to the disconnection codes which are notified from the network (i.e., the ISDN), the notification contents provides a message such as "a called number is incorrect" for the notification number 1, "a called terminal is busy" for the notification number 2, and so forth.

The notification numbers related to the dummy disconnection codes, which are notified by the facsimile apparatus 1 itself, lead to corresponding contents information that indicates non-availability of the corresponding specific service. In this case, the corresponding specific service becomes not available due to incorrectness of the corresponding pertinent information. Accordingly, as shown in FIG. 5, the character row of the contents information assigned to the notification number N1, for example, indicates a message that "AAA service is not available" and the one assigned to the notification number N2, for another example, indicates a message that "BBB service is not available." As described above, these specific services appeared in the number/contents reference table 3c of FIG. 5 are registered in the specific service registration table 7a of FIG. 3 linked to the number/contents reference table 3c of FIG. 5 via the code/number reference table 3b of FIG. 4.

The facsimile apparatus 1 is further provided with a number/guidance reference table 3d of FIG. 6, which is stored in the ROM 3. As shown in FIG. 6, the number/guidance reference table 3d includes guidance information associated with the notification numbers for the dummy call-disconnection-cause code on a one-to-one basis.

The guidance information indicates an appropriate guidance corresponding to the specific service which is not available due to incorrectness of the corresponding pertinent information. For example, the character row of the guidance information assigned to the notification number N1 indicates a message "Please check if XXX is properly registered" and the one assigned to the notification number N2 indicates a message "Please check if YYY is properly registered," as shown in FIG. 6. As described above, these specific services appeared in the number/guidance reference table 3d are registered in the specific service registration table 7a which is linked to the number/guidance reference table 3d via the code/number reference table 3b.

Figure 7A:
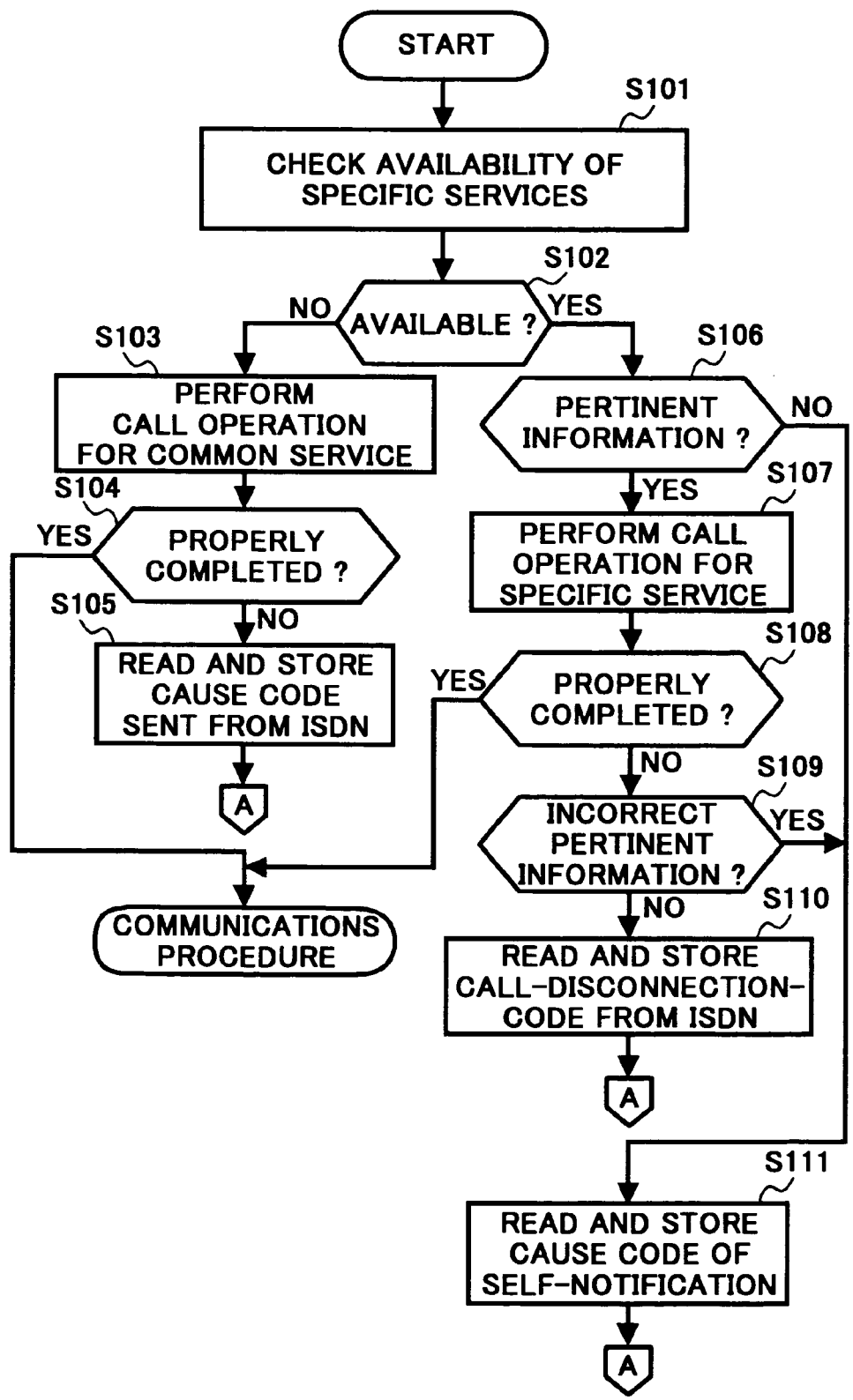

Next, an exemplary procedure of a call connection operation performed by the facsimile apparatus 1 of FIG. 1 is explained with reference to FIGS. 7A and 7B. As shown in FIG. 7A, the system controller 2 reads the information registered in the availability column of the specific service registration table 7a, in Step S101, and checks which specific service is registered as available in the specific service registration table 7a, in Step S102. If the system controller 2 reads no specific service registered as available in the specific service registration table 7a and the check result of Step S102 is NO, the system controller 2 determines that the facsimile apparatus 1 use no specific communications service and, in Step S103, performs the call operation which is a general communications service. Then, the system controller 2 checks if the call operation is properly performed. If the call operation is properly performed and the check result of Step S104 is YES, the system controller 2 proceeds to the communications procedure.

If the call operation is not properly performed and the check result of Step S104 is NO, the system controller 2 stores the general call-disconnection-cause then notified from the ISDN, in Step S105. Then, the process proceeds to a call disconnection process in Step S201 (FIG. 7B), explained later.

If the system controller 2 reads a specific service registered as available in the specific service registration table 7a and the check result of Step S102 is YES, the system controller 2 determines that the facsimile apparatus 1 can use that specific communications service. The system controller 2 further checks in Step S106 if the pertinent information corresponding to the available specific service exists in the pertinent information column of the specific service registration table 7a. At this time, the system controller 2 does not check if the contents of the pertinent information are appropriate.

If no pertinent information corresponding to the available specific service exists, regardless of its contents, and the check result of Step S106 is NO, the system controller 2 determines that a specific service registration error has occurred. In this case, the system controller 2 reads and stores the corresponding call-disconnection-cause code registered in the specific service registration table 7a, in Step S111, and proceeds to the call disconnection process in Step S201 (FIG. 7B).

If the system controller 12 reads that the pertinent information exists, regardless of its contents, and the check result of Step S106 is YES, the process proceeds to Step S107 in which the system controller 2 performs the call operation for the available specific service and sends necessary information from the pertinent information to the ISDN. In Step S108, the system controller 2 checks if the call operation for the available specific service is properly completed. If the call operation for the available specific service is properly completed and the check result of Step S108 is YES, the process proceeds to the call disconnection process of Step S201 (FIG. 7B).

If the call operation for the available specific service is not properly completed and the check result of Step S108 is NO, the process proceeds to Step S109 in which the system controller 2 further checks if the cause of the improperly-completed call operation is incorrectness of the corresponding pertinent information. If the cause of the improperly-completed call operation is incorrectness of the pertinent information and the check result of Step S109 is YES, the process proceeds to Step S111 in which the system controller 2 reads and stores the corresponding dummy code of the self-notification call-disconnection-cause registered in the specific service registration table 7a. Then, the process proceeds to the call-disconnection process in Step S201 (FIG. 7B).

If the cause of the improperly-completed call operation is not incorrectness of the pertinent information and the check result of Step S109 is NO, the process proceeds to Step S110. In this case, the system controller 2 determines that the error is the common call-disconnection. Therefore, in Step S110, the system controller 2 reads and stores the common call-disconnection-cause code notified from the ISDN. Then, the process proceeds to the call-disconnection process in Step S201 of FIG. 7B.

In this example being explained, the cases in which the corresponding pertinent information is not registered and in which the corresponding pertinent information is incorrectly registered are commonly represented by a single call-disconnection-cause code. However, these two cases may be represented by different call-disconnection-cause codes so that more detailed care can be taken against an error caused by the self-notification call-disconnection-cause. Accordingly, registration of the notification numbers, the contents of notification, and the guidance information need to be different for these two cases.

In Step S201 of FIG. 7B, the system controller 2 performs the call-disconnection operation. In Step S202, the system controller 2 reads and specifies the notification number in the code/number reference table 3b corresponding to the call-disconnection-cause code stored in Step S105, S110, or S111 of FIG. 7A. In Step S203, the system controller 2 reads and specifies the contents of the notification in the number/contents reference table 3c corresponding to the notification number specified in Step S202. In Step S204, the system controller 2 arranges to indicate the contents of the notification, specified in Step S203, with the LCD 9h.

An exemplary indication with the LCD 9h in Step S204 for a case of the self-notification call-disconnection-cause is shown in FIG. 8. As shown, the indication indicates that the XXX service is not available, wherein the XXX service is the specified specific service. As an alternative to this indication with the LCD 9h in Step S204, the message may be printed on the recording sheet with the printer 6 or may be transformed into a voice message. To use the voice message, the number/voice reference table 3c may be replaced with a number/voice reference table 3e in the ROM 3. As shown in FIG. 9, the number/voice reference table 3e includes voice data representing a message corresponding to each of the notification number registered in the number/contents reference table 3c. When a voice message is specified, it is subjected to a digital-to-analog conversion and a resultant analog signal is input into a loud speaker (not shown) so that the message is output.

After Step S204 of FIG. 7B, the system controller 2 checks in Step S205 if the call-disconnection-cause code is the self-notification type call 20 disconnection-cause code. If the call-disconnection-cause code is not the self-notification type call-disconnection-cause code but is the one sent from the ISDN and the check result of Step S205 is NO, the process ends. If the call-disconnection-cause code is the self-notification type call-disconnection-cause code and the check result of Step S205 is YES, the process proceeds to Step S206 in which the system controller 2 reads and specifies the guidance information in the number/guidance reference table 3d corresponding to the notification number specified in Step S202. After that, the system controller 2 performs notification of the guidance information in Step S207, and the process then ends.

Figure 10:
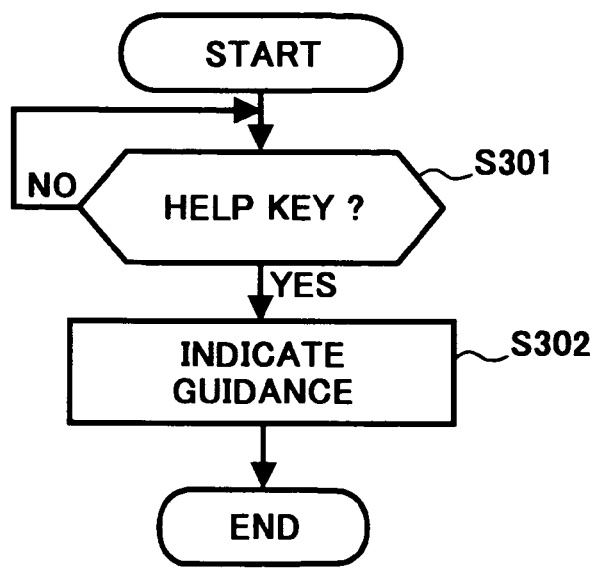
FIGS. 10 and 11 are flowcharts for explaining exemplary operations for notifying the user of information regarding guidance.

FIG. 10 shows an exemplary procedure of the guidance operation performed in Step S207. As shown in FIG. 10, the system controller 2 checks in Step S301 if the HELP key 9i is pressed. Since Step 301 forms a NO loop, the process proceeds to the next step when the HELP key 9i is pressed. In Step S302, the system controller 2 arranges to indicate the guidance information specified in Step S206 with the LCD 9h. Then, the guidance operation ends.

Figure 11:
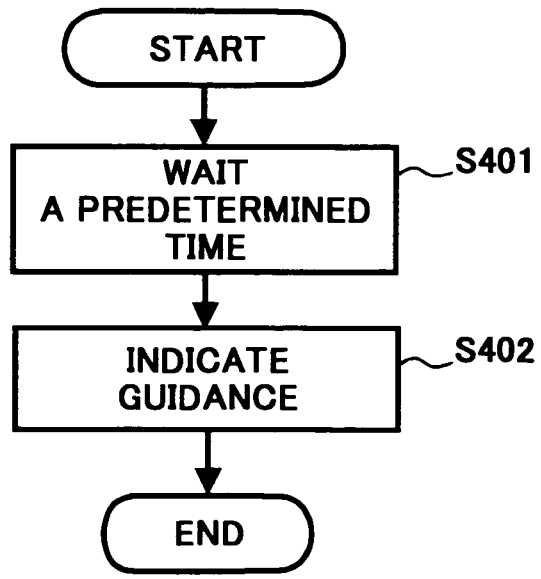

FIG. 11 shows another exemplary procedure of the guidance operation performed in Step S207. As shown in FIG. 11, the system controller 2 waits a predetermined time period (i.e., a 5-second time period) in Step S401. In Step S402, the system controller 2 arranges to indicate the guidance information specified in Step S206 with the LCD 9h. Then, the guidance operation ends.

An example of the indication performed in Step S302 of FIG. 10 or S402 of FIG. 11 is shown in FIG. 12. With such an indication, the facsimile apparatus 1 can inform the user of a way to use the specific service which is presently unusable due to the problem that the pertinent information is not registered or is incorrect. In Step S207 of FIG. 7B, the indication of the guidance information with the LCD 9h may alternatively be changed to a printing of the guidance information with the printer 6, or a voice message of the guidance information.

As an alternative, a number/contents and guidance reference table 3f of FIG. 13 may be used in place of the number/contents reference table 3c of FIG. 5 and the number/guidance reference table 3d of FIG. 6. In this case, the procedure of FIG. 7B is changed to that shown in FIG. 14.

That is, the number/contents and guidance reference table 3f of FIG. 13 combines the number/contents reference table 3c of FIG. 5 and the number/guidance reference table 3d of FIG. 6, with which the system controller 2 can increase the efficiency of reading the required information.

Figure 14:
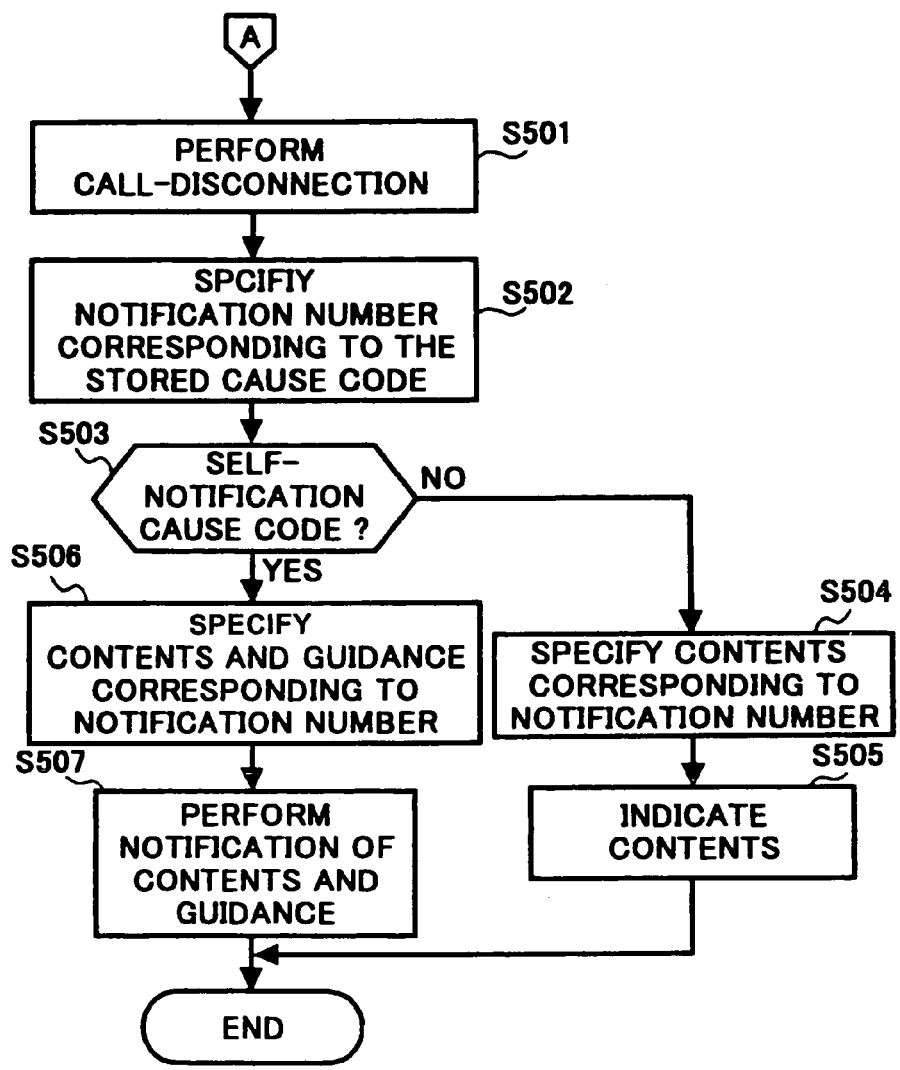
FIG. 14 is a flowchart for explaining an alternative call disconnection operation to that of FIG. 7B.

In Step S501 of FIG. 14, the system controller 2 performs the call-disconnection operation. In Step S502, the system controller 2 reads and specifies the notification number in the code/number reference table 3b corresponding to the call-disconnection-cause code stored in Step S105, S110, or S111 of FIG. 7A. In Step S503, the system controller 2 checks if the call-disconnection-cause code is the self-notification type call-disconnection-cause code. If the call-disconnection-cause code is not the self-notification type call-disconnection-cause code but is the one sent from the ISDN and the check result of Step S205 is NO, the process proceeds to Step S504. In Step S504, the system controller 2 reads and specifies the contents of the notification in the number/contents and guidance reference table 3f corresponding to the notification number specified in Step S502. In this case, there is no corresponding guidance information. In Step S505, the system controller 2 arranges to indicate the contents of the notification, specified in Step S504, with the LCD 9h. Then, the process ends.

The indication of the guidance information with the LCD 9h performed in Step S505 may alternatively be changed to a printing of the guidance information with the printer 6, or a voice message of the guidance information.

If the call-disconnection-cause code is the self-notification type call-disconnection-cause code and the check result of Step S503 is YES, the process proceeds to Step S506 in which the system controller 2 reads and specifies the contents and the guidance in the number/contents and guidance reference table 3f corresponding to the notification number specified in Step S502. After that, the system controller 2 performs notification of the contents and the guidance in Step S507, and the process then ends.

Figure 15:
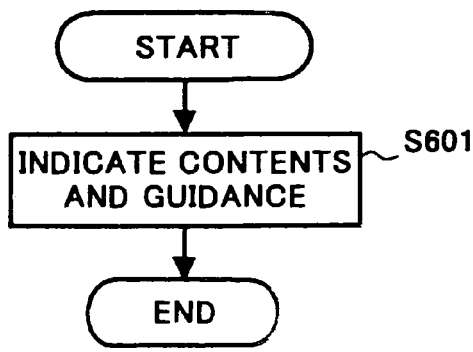
FIG. 15 is a flowchart for explaining an exemplary operation for notifying the user of the information of the contents and the guidance.
Figure 16:
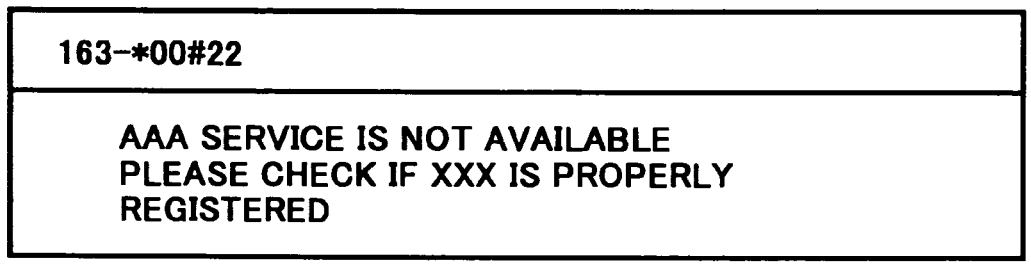
FIG. 16 is another example of an indication indicated to notify the user of the information of the notification contents and the guidance for solving the problem.

Referring to FIG. 15, an exemplary procedure of the notification of the contents and the guidance performed in Step S507 is explained. In Step S601, the system controller 2 arranges the indication of the contents and the guidance, specified in Step S506, with the LCD 9h. In this case, the LCD 9h indicates the contents and the guidance in a manner as shown in FIG. 16, for example. With such an indication, the facsimile apparatus 1 can inform the user what specific service is presently unusable due to the problem in that the pertinent information is not registered or incorrect and a way how the user can solve the problem to use that specific service.

Figure 17:
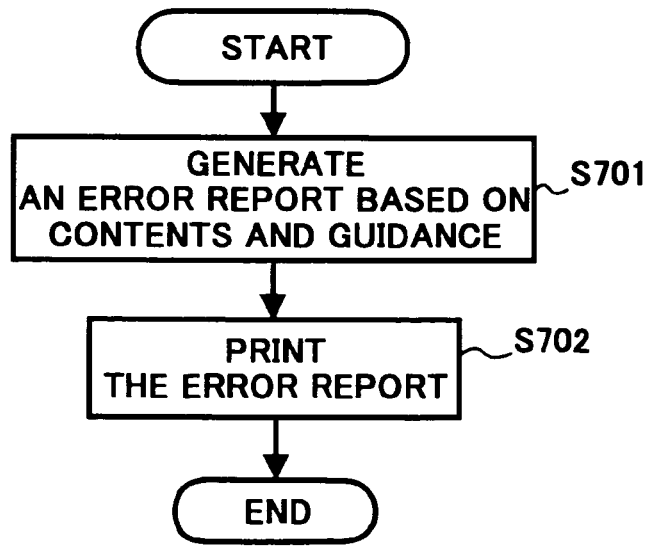
FIG. 17 is a flowchart for explaining an operation for generating an error report as another exemplary operation for notifying the user of the information of the contents and the guidance.

FIG. 17 shows another exemplary procedure of the notification of the contents and the guidance performed in Step S507. In Step S701 of FIG. 17, the system controller 2 extends in the image memory 8 the image data of the error report containing the information of the contents and the guidance specified in Step S506 of FIG. 14, using the font table 3a, so as to generate a bit-mapped image of the error report. Then, the system controller 2 instructs the printer 6 to print the error report, in Step S702. The process then ends.

With this operation, the facsimile apparatus 1 can inform the user what specific service is presently unusable due to the problem in that the pertinent information is not registered or incorrect and a way how the user can solve the problem to use that specific service. Furthermore, such a printed error report can remind the user of the problem in that the specific service cannot be used.

The notification of the contents and the guidance in Step S505 may be performed with a voice message. Thereby, the user can recognize the notification of the contents and the guidance without having to pay attention to the LCD 9h.

In this way, the facsimile apparatus 1 can inform the user what specific service is presently unusable due to the problem that the pertinent information is not registered or incorrect. Furthermore, the facsimile apparatus 1 can show the user a way to solve the problem of using that specific service so that the user can try to solve the problem alone. Thereby, the number of inquires from the users about troubles with the communications services may be decreased.

In the above-described exemplary embodiment, the facsimile apparatus 1 is connected to the ISDN as an example of a communications network. However, the present disclosure is not limited to it but is also applicable to a case where the facsimile apparatus 1 is connected to other networks such as a public switched telephone network (PSTN), a local area network (LAN), or the like.

Numerous additional modifications and variations of the present disclosure are possible in light of the above teachings. It is therefore to be understood that within the scope of the appended claims, the system and method disclosed therein may be practiced otherwise than as specifically described herein.

This application claims priority to Japanese patent application No. JPAP11-372147 filed on Dec. 28, 1999 in the Japanese Patent Office, the entire contents of which are hereby incorporated by reference.

What is claimed as new and is desired to be secured by Letter Patent of the United States is:

1. A communications terminal connected to at least one of a telephone line and a local area network, comprising:
   a first memory which stores service information including availability information representing availability of a specific communications service provided by a service provider through said at least one of the telephone line and the local area network and condition information suitable for said specific communications service;
   a second memory which stores message information indicating that said specific communications service is not usable;
   a detector configured to detect whether said service information stored in said first memory is appropriate each time said communications terminal starts a call connection operation to use said specific communications service based on said condition information; and
   an indicating mechanism configured to read said first memory and to indicate said message information indicating that said specific communications service is not usable when said detector detects that said service information stored in said first memory is inappropriate.

2. The communications terminal of claim 1, further comprising a third memory which stores guidance information for guiding a way to eliminate a cause due to which said specific communications service is not usable, wherein said indicating mechanism is further configured to read said third memory and to indicate said guidance information upon a predetermined input for starting a guidance indication operation after said indicating mechanism indicates said message information indicating that said specific communications service is not usable.

3. A communications terminal as defined in claim 1, further comprising a third memory which stores guidance information for guiding a way to eliminate a cause due to which said specific communications service is not usable, wherein said indicating mechanism is further configured to read said third memory and to indicate said guidance information when a predetermined time has elapsed after said indicating mechanism indicates said message information indicating that said specific communications service is not usable.

4. A communications terminal as defined in claim 1, wherein said second memory further stores guidance information for guiding a way to eliminate a cause due to which said specific communications service is not usable and said indicating mechanism indicates said message information indicating that said specific communications service is not usable and said guidance information when said detector detects that said service information stored in said first memory is inappropriate.

5. A communications terminal as defined in claim 4, wherein said indicating mechanism indicates said message information and said guidance information with a display.

6. A communications terminal as defined in claim 4, wherein said indicating mechanism sends said message information and said guidance information to a sound mechanism to output said message information and said guidance information as a voice message.

7. A communications terminal as defined in claim 4, wherein said indicating mechanism sends said message information and said guidance information to a printing apparatus to output said message information and said guidance information on a recording sheet.

8. A communications terminal connected to at least one of a telephone line and a local area network, comprising:
   first memory means for storing service information including availability information representing availability of a specific communications service provided by a service provider through said at least one of the telephone line and the local area network and condition information suitable for said specific communications service;
   second memory means for storing message information indicating that said specific communications service is not usable;
   detecting means for detecting whether said service information stored in said first memory means is appropriate each time when said communications terminal starts a call connection operation to use said specific communications service based on said condition information; and
   indicating means for reading said first memory means and indicating said message information indicating that said specific communications service is not usable when said detecting means detects that said service information stored in said first memory means is inappropriate.

9. The communications terminal of claim 8, further comprising third memory means for storing guidance information for guiding a way to eliminate a cause due to which said specific communications service is not usable, wherein said indicating means further reads said third memory means and indicates said guidance information upon a predetermined input for starting a guidance indication operation after said indicating means indicates said message information indicating that said specific communications service is not usable.

10. A communications terminal as defined in claim 8, further comprising third memory means for storing guidance information for guiding a way to eliminate a cause due to which said specific communications service is not usable, wherein said indicating means further reads said third memory means and indicates said guidance information when a predetermined time has elapsed after said indicating mechanism indicates said message information indicating that said specific communications service is not usable.

11. A communications terminal as defined in claim 8, wherein said second memory means further stores guidance information for guiding a way to eliminate a cause due to which said specific communications service is not usable and said indicating means indicates said message information indicating that said specific communications service is not usable and said guidance information when said detecting means detects that said service information stored in said first memory means is inappropriate.

12. A communications terminal as defined in claim 11, wherein said indicating means indicates said message information and said guidance information with a display.

13. A communications terminal as defined in claim 11, wherein said indicating means sends said message information and said guidance information to a sound mechanism to output said message information and said guidance information as a voice message.

14. A communications terminal as defined in claim 11, wherein said indicating means sends said message information and said guidance information to a printing apparatus to output said message information and said guidance information on a recording sheet.

15. A method of using a specific communications service provided by a service provider, comprising the steps of:
   providing service information including availability information representing availability of said specific communications service on a communications terminal connected to at least one of a telephone line and a local area network and condition information suitable for said specific communications service;
   a first storing step of storing message information indicating that said specific communications service is not usable;
   detecting whether said service information provided in said providing step is appropriate each time a call connection operation is started on said communications terminal to use said specific communications service based on said condition information;
   reading said service information; and
   indicating that said specific communications service is not usable when said detecting step detects that said service information provided in said providing step is inappropriate.

16. A method as defined in claim 15, further comprising a second storing step for storing guidance information for guiding a way to eliminate a cause due to which said specific communications service is not usable, wherein said reading step reads said guidance information and said indicating step indicates said guidance information upon a predetermined input for starting a guidance indication operation after said indicating step indicates said message information indicating that said specific communications service is not usable.

17. A method as defined in claim 15, further comprising a second storing step for storing guidance information for guiding a way to eliminate a cause due to which said specific communications service is not usable, wherein said reading step reads said guidance information and said indicating step indicates said guidance information when a predetermined time has elapsed after said indicating step indicates said message information indicating that said specific communications service is not usable.

18. A method as defined in claim 15, wherein said first storing step further stores guidance information for guiding a way to eliminate a cause due to which said specific communications service is not usable and said indicating step indicates said message information indicating that said specific communications service is not usable and said guidance information when said detecting step detects that said service information provided in said providing step is inappropriate.

19. A method as defined in claim 18, wherein said indicating step indicates said message information and said guidance information with a display.

20. A method as defined in claim 18, wherein said indicating step sends said message information and said guidance information to a sound mechanism to output said message information and said guidance information as a voice message.

21. A method as defined in claim 18, wherein said indicating step sends said message information and said guidance information to a printing apparatus to output said message information and said guidance information on a recording sheet.

22. A computer readable medium storing computer instructions for performing the method of any one of claims 15–21.

23. A communications terminal used with a communication service provided by service providers, comprising:

information storage for 1) service information including availability information indicative of availability of one or more communication services provided by one or more service providers, 2) condition information suitable for the respective communication services, and 3) message information indicative of whether the respective one or more communication services are usable;

detection facilities communicating with said information storage in relation to an initiation of a call connection operation seeking to use a selected communication service to detect if the selected communication service is suitable in relation to condition information stored in said information storage; and an indicating facility communicating with said information storage in relation to a detection by the detection facility that the selected communication service is not suitable to provide an indication thereof.

* * * * *